US012534950B2

(12) United States Patent
Fumanelli

(10) Patent No.: US 12,534,950 B2
(45) Date of Patent: Jan. 27, 2026

(54) DRAWER FOR BANKNOTES AND VALUES FOR ATM, BANCOMAT AND THE LIKE

(71) Applicant: M.I.B. S.r.L., Milan (IT)

(72) Inventor: Giuseppe Ezio Fumanelli, Melzo (IT)

(73) Assignee: M.I.B. S.R.L., Milan (IT)

(*) Notice: Subject to any disclaimer, the term of this patent is extended or adjusted under 35 U.S.C. 154(b) by 204 days.

(21) Appl. No.: 17/658,040

(22) Filed: Apr. 5, 2022

(65) Prior Publication Data

US 2022/0333430 A1 Oct. 20, 2022

(30) Foreign Application Priority Data

Apr. 14, 2021 (IT) ........................ 102021000009449

(51) Int. Cl.
*E05G 1/12* (2006.01)
*E05G 1/14* (2006.01)
*G07D 11/125* (2019.01)

(52) U.S. Cl.
CPC ................. *E05G 1/12* (2013.01); *E05G 1/14* (2013.01); *G07D 11/125* (2019.01)

(58) Field of Classification Search
CPC .. E05G 1/12; E05G 1/14; G08B 15/02; G07D 11/125
See application file for complete search history.

(56) References Cited

U.S. PATENT DOCUMENTS 4,852,502 A * 8/1989 Klingberg ................. E05G 1/14 109/42
5,388,433 A * 2/1995 Andersson .......... E05B 73/0017 70/57.1
5,732,638 A * 3/1998 Van Lint ................... E05G 1/14 109/36
6,564,726 B1 * 5/2003 Lindskog .................. E05G 1/14 109/25
6,712,011 B2 * 3/2004 Fumanelli ................. E05G 1/14 109/20

(Continued)

FOREIGN PATENT DOCUMENTS

EP 1519329 A2 3/2005
EP 3654306 A1 5/2020

(Continued)

OTHER PUBLICATIONS

Italian Search Report mailed Dec. 20, 2021 to M.I.B. S.r.L. for IT 102021000009449 filed Apr. 14, 2021.

*Primary Examiner* — Christopher J Boswell
(74) *Attorney, Agent, or Firm* — Vorys, Sater, Seymour and Pease LLP; Anthony P. Venturino; Feehery Hank

(57) ABSTRACT

A drawer for ATM, Bancomat and the like, for banknotes and valuables, including: a base support suitable to support the banknotes along a support plane on a first side, a marking device including: a tank including marking fluid, a distribution device, in fluid passage connection with the tank and suitable for conveying the marking fluid from the tank to the banknotes for marking, transfer device suitable for transferring, on command, the marking fluid from the tank to the banknotes via the distribution device, wherein the tank is arranged, with respect to the base support, on a second side, opposite the first side, and wherein the distribution device is suitable for transferring the marking fluid to the first side in the direction of the banknotes.

14 Claims, 3 Drawing Sheets

(56) References Cited

U.S. PATENT DOCUMENTS

| | | | | |
|---|---|---|---|---|
| 8,464,648 | B2 * | 6/2013 | Villiger | E05G 1/14 109/33 |
| 8,631,748 | B2 * | 1/2014 | Tavares de Pinho | E05G 1/14 109/20 |
| 10,676,980 | B2 * | 6/2020 | Grant | E05G 1/14 |
| 2002/0029728 | A1 * | 3/2002 | Walker | E05G 1/14 109/25 |
| 2003/0005882 | A1 | 1/2003 | Fumanelli | |
| 2005/0051448 | A1 * | 3/2005 | Miles | G07D 11/125 206/459.1 |
| 2021/0002944 | A1 * | 1/2021 | Fumanelli | G07D 11/225 |

FOREIGN PATENT DOCUMENTS

| | | | |
|---|---|---|---|
| GB | 2465349 | A | 5/2010 |
| IT | 102017000023766 | | 6/2019 |
| WO | 03065316 | A1 | 8/2003 |

* cited by examiner

*Fig. 4*
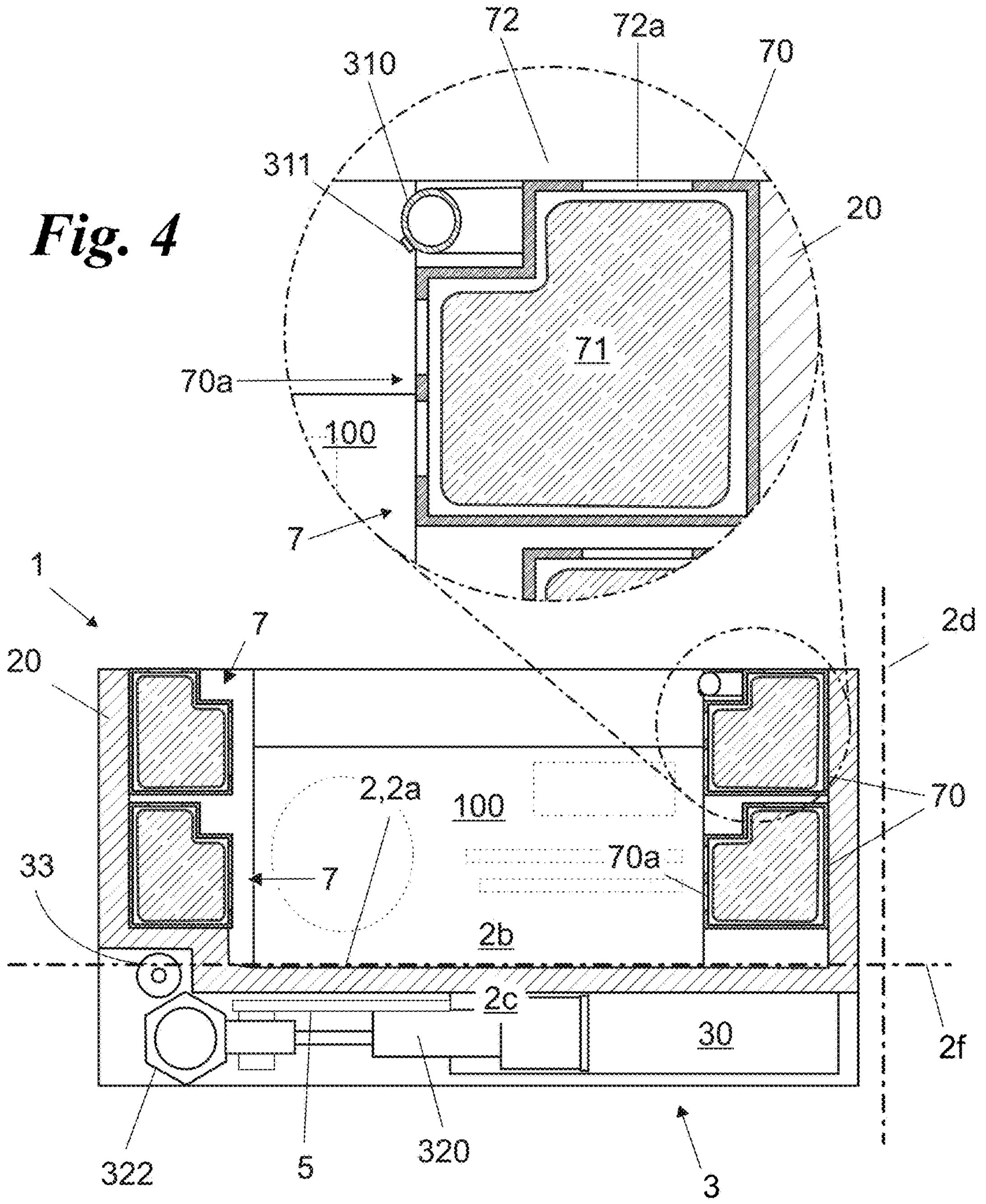
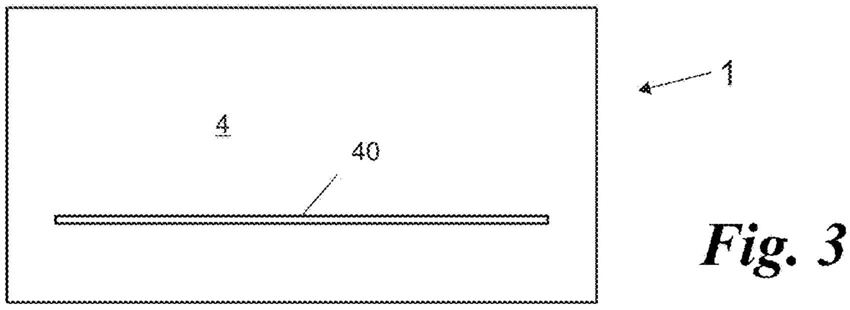
*Fig. 3*

DRAWER FOR BANKNOTES AND VALUES FOR ATM, BANCOMAT AND THE LIKE

The present invention relates to a drawer for ATM, Bancomat and the like for banknotes and values of the type specified in the preamble to the first claim.

Various types of containers for banknotes and valuables are currently known, such as, for example, ATM, Bancomat and similar drawers.

As is well known, ATMs, Bancomat and the like are automatic machines for distributing and storing banknotes.

The user of an ATM, Bancomat or like can therefore withdraw, and in some cases also inserting, cash from his or her bank account if he or she has the appropriate means of identification, such as an ATM card and a numeric password. The so-called ATMs and Bancomat are therefore very advantageous because they allow the withdrawal of cash at any time and without the need for an interface with natural persons.

However, the said Bancomats, ATM and similar machines lend themselves very much to fraud and break-ins, since they are exposed in public places even at night and contain banknotes and valuables.

In order to protect the contents, the Bancomats, ATM and the like are equipped with a safe in which a number of boxes are usually arranged to hold the banknotes.

In addition, the Bancomats, ATM and the like are equipped with a means of detecting break-ins, so that countermeasures can be activated and the police can be contacted automatically.

For example, some ATMs and the like are also equipped with a marking device, which marks banknotes and valuables with indelible ink in the event of a break-in. The marked banknotes are consequently invalidated and cannot be used, because their provenance from a break-in is clear and unmistakable. A similar marking device is described in the applicant's own patent applications EP 1 519 329 A2 and D1 US 2003/005882 A1 of the same applicant and patent application GB2465349A. Furthermore, patent application IT 102017000023766, also by the applicant, teaches the use of ink and rare earth elements to better identify banknotes and valuables.

The said apparatus comprises an ink tank and a channelling system for distributing the ink to the individual cassettes. The channelling system accordingly comprises removable couplers to allow removal and insertion of the drawer and its necessary disconnection from the marking device integral to the safe.

These marking devices have the disadvantage that, in the event of an explosion, the channelling system may break down and prevent the transfer of ink to the drawers and the subsequent marking of notes and valuables.

Such drawback has been overcome by a container consisting of a drawer for ATM, Bancomat and the like as described in patent application IT MI 2000 A 000009, by the same applicant, which teaches to place the entire marking device directly inside the drawer.

However, the latter type of apparatus requires the necessary space inside the container itself, and in particular the drawer for ATM, Bancomat and the like.

The said drawers do not always have the necessary space, since, in particular the latest generations of Bancomat and ATM drawers are equipped with burglary detection means, automatic banknote transport devices, electronics, means of electronic connection to the control means of the ATM, Bancomat and the like, and other means. They must also contain banknotes of different denominations and even large sizes such as €200 notes and the like.

In this situation, the technical task at the basis of the present invention is to devise a drawer for ATM, Bancomat and the like for banknotes and valuables which is able to substantially obviate at least part of the aforementioned drawbacks.

In the context of said technical task, it is an important scope of the invention to obtain a drawer for ATM, Bancomat and the like for banknotes and valuables, which allows banknotes and valuables to be marked with certainty even in the event of an explosion. A further important object of the invention is to achieve a drawer for ATM, Bancomat and the like which is capable of holding banknotes, even of considerable size.

The technical task and the specified purposes are achieved by a drawer for ATMs, Bancomats and the like for banknotes and valuables as claimed.

BRIEF DESCRIPTION OF THE DRAWINGS

Preferred technical solutions are highlighted in the dependent claims.

The features and advantages of the invention are hereinafter clarified by the detailed description of preferred embodiments of the invention, with reference to the appended drawings, wherein:

Figure 1:
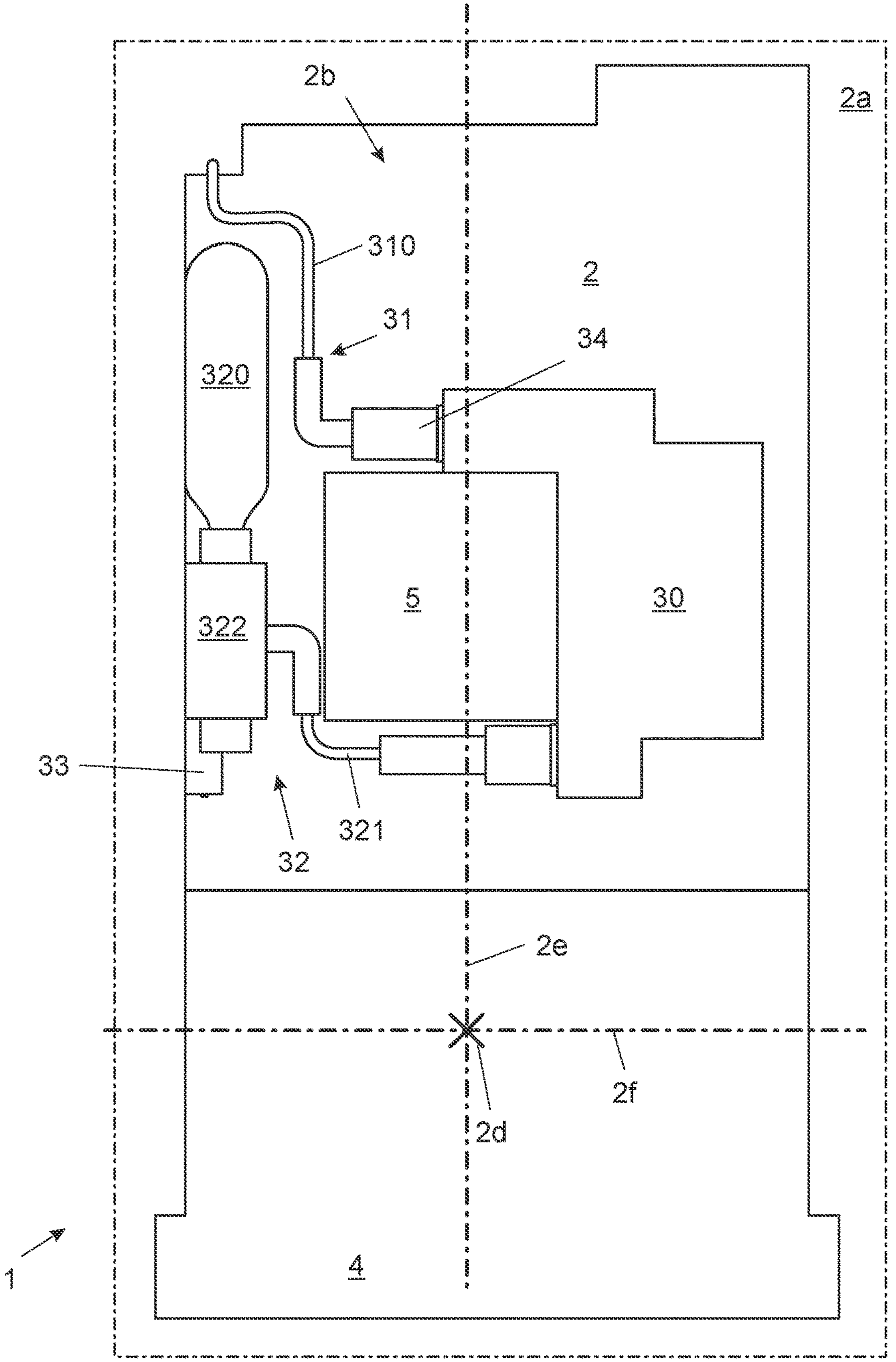
Figure 2:
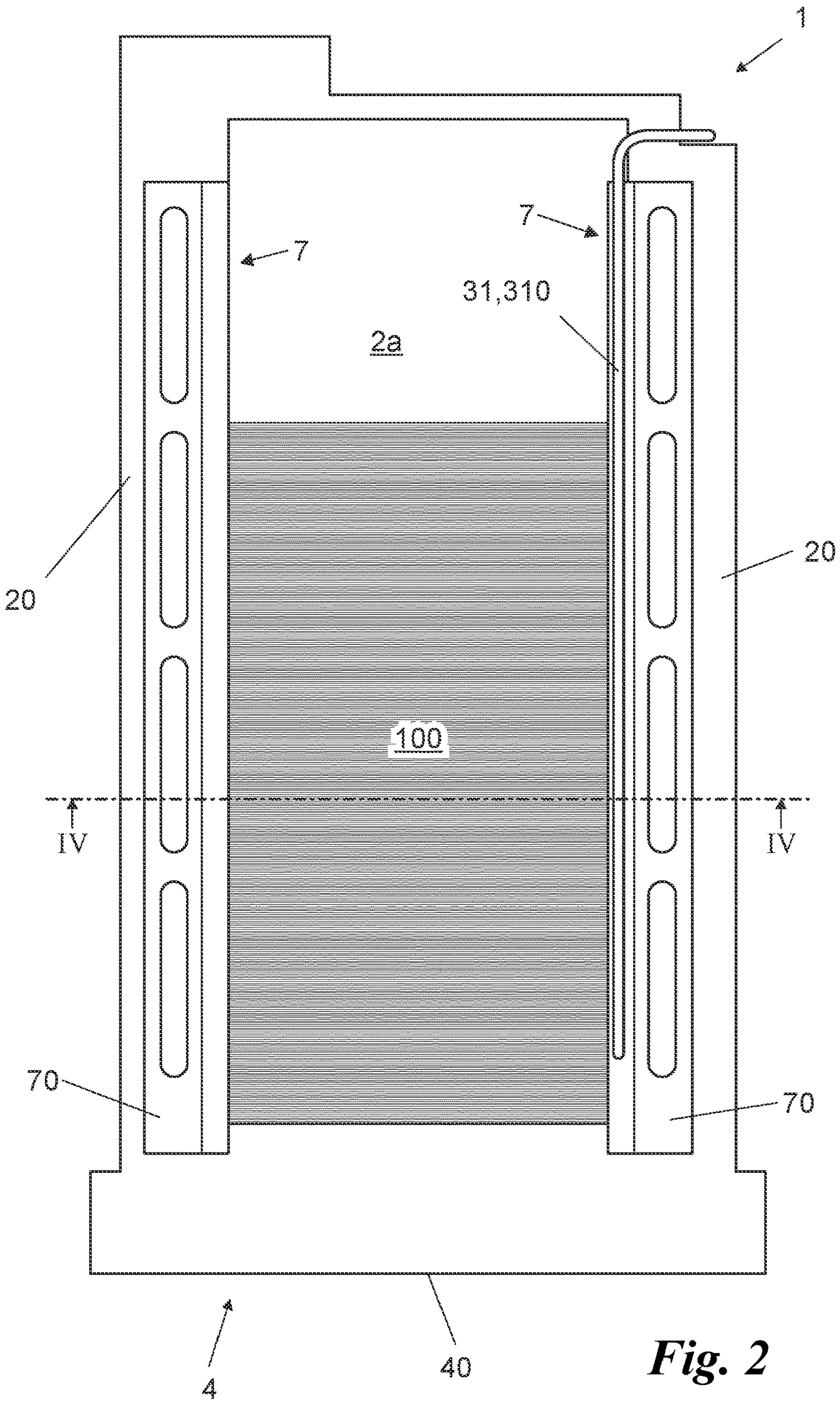

the FIG. 1 illustrates a bottom view of the banknote and value container according to the invention;

the FIG. 2 illustrates a top view of the banknote and value container according to the invention;

the FIG. 3 is a front view of the banknote and value container according to the invention; and the FIG. 4 shows section IV-IV, shown in FIG. 4 with an enlargement.

BRIEF DESCRIPTION OF THE PREFERRED EMBODIMENTS

In the present document, the measurements, values, shapes and geometric references (such as perpendicularity and parallelism), when associated with words like "about" or other similar terms such as "approximately" or "substantially", are to be considered as except for measurement errors or inaccuracies due to production and/or manufacturing errors, and, above all, except for a slight divergence from the value, measurements, shape, or geometric reference with which it is associated. For instance, these terms, if associated with a value, preferably indicate a divergence of not more than 10% of the value.

Moreover, when used, terms such as "first", "second", "higher", "lower", "main" and "secondary" do not necessarily identify an order, a priority of relationship or a relative position, but can simply be used to clearly distinguish between their different components.

Unless otherwise specified, as results in the following discussions, terms such as "treatment", "computing", "determination", "calculation", or similar, refer to the action and/or processes of a computer or similar electronic calculation device that manipulates and/or transforms data represented as physical, such as electronic quantities of registers of a computer system and/or memories in, other data similarly represented as physical quantities within computer systems, registers or other storage, transmission or information displaying devices.

The measurements and data reported in this text are to be considered, unless otherwise indicated, as performed in the International Standard Atmosphere ICAO (ISO 2533:1975).

With reference to the Figures, the banknote and cash drawer according to the invention is globally indicated by number 1.

It is suitable for holding banknotes 100 and valuables, in particular banknotes. In particular, it is preferably a drawer, a banknote container, for ATMs, Bancomats and the like.

The invention consequently also discovers an ATM, Bancomat and the like comprising a drawer 1 described below.

The drawer 1 for banknotes 100 and valuables, comprising a base support 2 suitable for supporting the banknotes 100 along a support surface 2*a* on a first side 2*b*. Said base support 2 is therefore preferably a substantially flat structure or which, in any case, defines a support and separation plane, coinciding with the support plane 2*a*, which may also be defined by a non-continuous structure, for example ribbed or crossbars. On said support plane 2*a*, the banknotes 100 are preferably arranged along their long side.

The support plane 2*a* then divides the space into a first side 2*b*, where the banknotes are placed, and a second side 2*c*, opposite the first side 2*b*.

The support plane 2*a* further defines a normal direction 2*d*, perpendicular to the support plane 2*a*, a longitudinal direction 2*e*, lying on the plane 2*a* and coinciding with the prevailing direction of development of the container 1 along said support plane 2*a*, preferably coinciding with the direction of insertion and extraction of the drawer 1, and also a transversal direction 2*f*, lying on the plane 2*a* and perpendicular to the longitudinal direction 2*e* and obviously also to the normal direction 2*d*.

The container 1 also comprises, preferably sides 20, perpendicular to the support plane 2*a* and bordering an internal volume of the drawer 1 in said first side 2*a*.

Along the second side 2*c*, usually referred to as the space "underneath" the drawer 1, the footprint of the container 1 is preferably non-zero, due to the various devices described below, but also due to the reinforcing and mechanically connecting structures of the container 1. Indeed, the container 1 comprises, for example, ribs or structures extending in a normal direction 2*d* along said second side 2*c*.

The structure of the container 1 is also, preferably, made of a polymeric material.

The container 1 preferably comprises, in brief, a marking device 3, described below, and preferably also banknote transfer means 4, suitable for automatically transferring said banknotes 100 with the outside of the drawer 1 and comprising a dispensing mouth 40, electronic means such as an electronic board 5, electronic means such as an electronic board 5, which can be connected to the control and command means of the ATM, Bancomat or similar, means for detecting a break-in attempt or attempted break-in, means for signalling said break-in attempt to the police or other means, or other means, for example, for checking the closing of the drawer.

Apart from the marking device 3, the container 1 may be of a known type, for example it may be a drawer for ATMs and the like marketed by NCR Corporation®, with registered office in Atlanta, Georgia, United States, and manufactured by Glory marketed under the Glory BRM 10 trademark.

The marking device 3 preferably comprising, in brief: a tank 30 comprising marking fluid, a distribution device 31, in fluid passage connection with the tank 30 and suitable for conveying the marking fluid from the tank 30 in the direction of the banknotes 100 for marking, and transfer means 32 suitable for transferring, on command, the marking fluid from said tank 30 to the banknotes 100 through the distribution device 31.

More in detail, the marking fluid is preferably marking ink of a known type, and for example of the type described in patent application EN 102017000023766 from page 5 line 17 to page 6 line 11.

The tank 30 comprises a fluid-tight container and is preferably arranged, with respect to the base support 2, on the second side 2*c*. The tank 30 is also preferably constrained, more preferably directly constrained, for example by screws or glues, to the base support 2 (FIG. 4). It also preferably has a footprint, in the normal direction 2*d* along the second side 2*c*, not exceeding the footprint, in the same normal direction 2*d* along the second side 2*c*, conferred by the elements of the drawer 1 not comprising the marking device 3. In particular, its encumbrance in the described direction is not greater than the encumbrance of the banknote transfer means 4.

In addition, preferably, the footprint of the entire marking device 3 in the normal direction 2*d* along the second side 2*c*, is not greater than the footprint, in the same normal direction 2*d* along the second side 2*c*, conferred by the elements of the container 1 not constituted by the marking device 3. The same applies, more preferably, also along the longitudinal directions 2*e* and transverse directions 2*f*. The footprint of the branding apparatus 3 therefore preferably does not exceed the footprint of the container 1 without the same apparatus 3.

More preferably, the drawer 1 also comprises an electronic board 5 placed on the second side 2*c* and not at an edge along said second side 2*c*, but substantially at the centre of the container 1 in the transverse direction 2*f*. In such a case, suitably the container 30 is substantially arranged close to the electronic board 5, more preferably surrounding it on two sides, as illustrated in FIG. 1.

In detail, the tank 30 is preferably an upright prism having a base adapted to the available space, is preferably made of metal, and preferably has a height between 5 mm and 5 cm in the normal direction 2*d*, more preferably between 1 cm and 3 cm. It is also preferably constrained to the base support 2.

The distribution device 31, is suitably adapted to transfer the marking fluid to the first side 2*a* at the banknotes 100. It may comprise any type of channelling, including a hole along the base support. Preferably, the distribution device 31 comprises a conduit 310, preferably tubular, partially disposed on the first side 2*a*, where it is in connection with the tank 30 and partially disposed above, with respect to said base support 2, the banknotes 100. In correspondence with the banknotes 100, the tubular conduit 310 is preferably provided with a plurality of nozzles 311 suitable for spraying the banknotes 100. They preferably comprise holes along the wall of the tubular conduit extending in a longitudinal direction 2 and substantially along the entire area of the banknotes 100.

In more detail, the tubular conduit 310 extends from the tank 30 to a corner of the container 1, from there it ascends towards the first side 2*a*, in a normal direction 2*d*, until it exceeds the height of the banknotes and from there it extends, in a longitudinal direction 2*e*, along the edge of the drawer 1, preferably at a bank 20, along a large part of the drawer 1. The tubular conduit 310 is preferably made of metal.

The transfer means 32 may be of any type, for example suitable for increasing the pressure of the marking fluid within the tank 3, or comprise pumps or the like.

In a preferred example, the transfer means 32 comprise a pressurized fluid container 320 and a funnel 321 suitable for connecting, in fluid passage connection, the pressure fluid container 320 with the tank 30. They further preferably comprise a control-openable closing valve 322 for interrupting or allowing the fluid passage connection between the pressurized fluid container 320 and the tank 30.

The closing valve 322 is preferably a solenoid valve connected to activation means such as ATM, Bancomat and similar control means, or to electronic means on the container 1 or other external control means. They are suitable for opening the valve 322 in alarm conditions signalled by the burglary or attempted burglary sensor means, which are in themselves known to the technician in the field.

The transfer means 32 are also preferably arranged, with respect to said base support 2, on said second side 2*c*.

Furthermore, preferably, if the container 1 comprises said electronic board 5 placed on the second side 2*c* with respect to the support plane 2*a* and not at an edge along said second side 2*c*, in such a case, the transfer means 32 are also suitably placed behind the electronic board 5. More preferably, the pressurized fluid container 320, and the closing valve 322, are placed on the opposite side of the tank 30 with respect to the electronic board 5, while the conduit 321 runs along another side of the electronic board 5. The last side of the electronic board 5 is preferably surrounded in part by the tank 30 in part by the first portion of the conduit 310, as illustrated in FIG. 1. In short, the marking device 3 is substantially arranged around said electronic board 5.

In order to activate the closing valve 322, as already mentioned for example a solenoid valve, and/or other devices in particular part of the marking device 3 or other elements, the container 1 may comprise an electric battery 33, of known and preferably standard type.

The marking device 3 may further comprise a sacrificial diaphragm 34 suitable for preventing or allowing the fluid passage connection between the tank 30 and the distribution device 31, in particular the conduit 310. It is preferably suitable for breaking up and allowing the passage of the marking fluid from the tank 30 to the distribution device 31 when the pressure inside the tank exceeds a threshold value. In particular, this occurs due to the connection established between the pressurized container 320 and the tank 30.

The marking device 3 may further comprise one or more further marking devices 7 on the first side 2*b*. Such devices are of the type described in patent application EP 3 761 276 A1, of the applicant itself, in paragraphs 21 to 60 and illustrated in FIGS. 3-8 of the same patent application, which is considered herein incorporated by reference.

Said marking devices 7 preferably each comprise a first container 70 arranged in drawer 1, preferably on one side or on the top (FIG. 4). If necessary, first containers 70 may also be arranged on the base of the drawer 1. The first container 70 is also preferably arranged in the vicinity of the banknotes and valuables 100 and comprises a fluid-permeable portion 70*a*, facing the banknotes or valuables 100.

The marking device 7 further preferably comprises a second fluid-permeable marking fluid container 71 contained in the first container 70.

The second container 71 is of a yielding type and easily breakable in the event of explosion pressurisation or the like. It is, for example, in a breakable polymeric membrane, or polymeric film. The said second container 71 may be subdivided into a plurality of main portions, mutually connected, in fluid passage connection, by passage portions preferably having a smaller passage section than sections within said main portions, preferably defined by passage reducers, such as transverse welds, within said second container 71.

The first container 70, for the purpose of breaking, in the event of deformation due to explosions and the like, the second container 71 more easily, may comprise asperities, points or wedges or slots comprising acute angles (for example contiguous circular holes).

The first container 70 preferably has an inner volume 70*b* separated from the outer portion of the drawer 1 by at least one separating wall 72, which may be the wall of the drawer 1 and/or the wall of the first container 70.

The separating wall 72 comprises passage windows or weakened portions 72*a* that allow, in the event of an explosion, the pressure wave to pass through the weakened portions 72*a* or holes, easily breaking them or passing through them and reaching the second containers 71 by breaking them and spilling ink onto the banknotes 100.

The operation of the container 1 described above in structural terms is as follows.

It functions in the same way as the drawers comprising a marking device 3 of a known type.

In particular, in the event of a break-in attempt, the break-in or attempted fraud or illegal access sensor means perceive said attempt and, through the control means of the Bancomat, ATM and the like, and the electronic means, activate the transfer means 32.

In particular, the transfer means 32, open the closing valve 322. The latter puts the pressurized fluid container 320 in communication with the tank 30. The pressure in the latter increases, consequently, preferably by exceeding 2 bar, more preferably by exceeding 4 bar.

The marking fluid under pressure passes the sacrificial diaphragm 34 and enters the distribution device 31. The marking fluid is then transferred through the conduit 310 to the nozzles 311 and here it is atomised onto the banknotes 100.

The banknotes 100 are thus clearly and conspicuously marked and their use by malicious persons is impossible. On the contrary, it is possible for a mint to replace them.

Furthermore, as previously described, in the event of an explosion, the pressure wave passes through the weakened portions 72*a* or holes and reaches the second containers 71 breaking them, also by means of the interaction between the first and second containers 70 and 71, and spilling the ink onto the banknotes 100, which are thus marked.

The container 1 according to the invention achieves important advantages.

Indeed, it allows the banknotes 100 and values to be marked with certainty even in the event of an explosion, since the marking system is entirely included in the drawer or container 1.

Furthermore, the marking device 3 does not vary the space available to the banknotes, since it is almost entirely placed below the base support 2.

The invention is susceptible to variations within the scope of the inventive concept as defined by the claims. Within this scope, all details are substitutable by equivalent elements and the materials, shapes and dimensions can be any.

The invention claimed is:

1. A drawer for ATM, Bancomat and like, for banknotes and valuables, comprising:

a base support having opposed first and second sides, said first side facing away from said second side, said first side separated from said second side, said first side being a top wall and said second side being a bottom wall such that the first side overlays the second side, the first side for supporting the banknotes, wherein said first side comprises a support plane for supporting the banknotes on the support plane, wherein the base support is a substantially flat structure defining a support and separation plane, wherein the support and separation plane is coinciding with the support plane, wherein the support plane is separated from said second side, wherein said first side defines a support surface along said support plane and said base support is capable of supporting said banknotes along the support surface on said first side, wherein said base support defines a longitudinal direction lying on the support plane and extending along the support plane, wherein said base support defines a transversal direction lying on the support plane and perpendicular to the longitudinal direction and extending along the support plane, wherein said base support defines a normal direction perpendicular to the support plane, wherein the normal direction is perpendicular to the first side, and wherein the normal direction is perpendicular to the second side, side walls perpendicular to the support plane, the side walls and first side bordering an internal volume of the drawer, a marking device comprising:

a tank including marking fluid, a distribution device in fluid passage connection with said tank and capable of conveying said marking fluid from said tank to said banknotes for the marking, transfer means capable of transferring, on command, said marking fluid from said tank to said banknotes through said distribution device, wherein said tank is arranged, with respect to said base support, on said second side of said base support, opposite to said first side, wherein said distribution device is able to transfer said marking fluid to said first side in the direction of said banknotes, and wherein the distribution means comprises channelling connected to said tank on the second side to extend from the tank and ascend towards the first side in a normal direction.

2. The drawer according to claim 1, wherein said distribution device comprises a conduit partially disposed in said first side, above said banknotes, with respect to said base support, and comprising a plurality of nozzles capable of spraying said banknotes.

3. The drawer according to claim 2, wherein said tank is directly constrained to said base support.

4. The drawer according to claim 1, wherein said transfer means comprise a container of pressurized fluid, a funnel capable of connecting, in fluid flow connection, said container of pressurized fluid with said tank, a closing valve which is openable on command, designed to interrupt or allow the fluid passage connection between said pressurized fluid container and said tank.

5. The drawer according to claim 4, wherein said tank is directly constrained to said base support.

6. The drawer according to claim 1, wherein said transfer means are arranged, with respect to said base support, on said second side.

7. The drawer according to claim 1, defining said normal direction, perpendicular to said support surface, and in which said marking device has a dimension, in said normal direction along said second side, not exceeding the overall dimensions, in said normal direction along said second side, conferred by elements of said drawer not constituted by said marking device.

8. The drawer according to claim 1, wherein said marking device comprising a sacrificial diaphragm capable of preventing, when integral, the connection of fluid passage from said tank to said distribution device and adapted to free the passage when the pressure inside said tank exceeds a threshold value.

9. The drawer according to claim 1, comprising an electronic board placed on said second side with respect to said support plane and not in correspondence with an edge along said second side, and in which said marking device is substantially arranged around said electronic board.

10. The drawer according to claim 1, comprising a second marking device disposed in said first side and comprising:

a first container arranged in a vicinity of said bank notes, said first container having an internal volume separated from said external portion of said safety container drawer by at least one separating wall, said first container being able to contain marking fluid.

11. The drawer according to claim 10, wherein said separating wall comprises passage windows or weakened portions.

12. The drawer according to claim 10, comprising a second container for marking fluid, fluid-tight, contained in said first container and type of yielding and easily breakable in the event of an explosion or pressurization similar.

13. The drawer according to claim 1, wherein said tank is directly constrained to said base support.

14. The drawer according to claim 1, wherein said distribution device comprises a conduit partially disposed in said first side.

* * * * *